United States Patent
Linck et al.

(10) Patent No.: US 11,906,010 B2
(45) Date of Patent: Feb. 20, 2024

(54) SACRIFICIAL MATERIALS TO IMPROVE CHEMICAL VAPOR INFILTRATION OF $B_4C$ LOADED PREFORMS

(71) Applicant: GOODRICH CORPORATION, Charlotte, NC (US)

(72) Inventors: John S. Linck, Pueblo, CO (US); Thomas Perea, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/751,051

(22) Filed: May 23, 2022

(65) Prior Publication Data

US 2023/0375061 A1 Nov. 23, 2023

(51) Int. Cl.
| | | |
|---|---|---|
| *F16D 69/02* | (2006.01) |
| *C04B 38/06* | (2006.01) |
| *C04B 35/80* | (2006.01) |
| *C04B 35/628* | (2006.01) |
| *C04B 41/81* | (2006.01) |
| *C04B 41/45* | (2006.01) |

(52) U.S. Cl.
CPC .......... *F16D 69/02* (2013.01); *C04B 35/6286* (2013.01); *C04B 35/62892* (2013.01); *C04B 35/80* (2013.01); *C04B 38/065* (2013.01); *C04B 38/067* (2013.01); *C04B 41/4531* (2013.01); *C04B 41/81* (2013.01); *C04B 2235/3821* (2013.01); *C04B 2235/5256* (2013.01); *C04B 2235/614* (2013.01); *C04B 2235/616* (2013.01); *F16D 2200/0065* (2013.01)

(58) Field of Classification Search
CPC .................................................. C04B 35/6286
See application file for complete search history.

(56) References Cited

U.S. PATENT DOCUMENTS

| 4,437,951 A * | 3/1984 | Bissot ..................... C25B 13/08 |
| | | 204/266 |
| 10,011,535 B2 | 7/2018 | La Forest et al. |
| 10,202,854 B2 | 2/2019 | Uskert et al. |
| 10,584,070 B2 | 3/2020 | Corman et al. |
| 10,995,039 B1 | 5/2021 | Dunn et al. |
| 11,097,983 B2 | 8/2021 | Hall et al. |

(Continued)

FOREIGN PATENT DOCUMENTS

EP 2993016 3/2016

OTHER PUBLICATIONS

European Patent Office, European Search Report dated Nov. 2, 2023 in Application No. 23173924.4.

*Primary Examiner* — Robert A Vetere
(74) *Attorney, Agent, or Firm* — SNELL & WILMER L.L.P.

(57) ABSTRACT

A method of forming a composite component is provided. The method includes locating a fibrous preform, providing a slurry, mixing the slurry with sacrificial fibers, injecting the slurry into the fibrous preform, heating the fibrous preform, forming channels in the fibrous preform, and densifying the fibrous preform. The sacrificial fibers are suspended in the fibrous preform along an injection pathway such that heating the sacrificial fibers forms the channels along the injection pathway as the sacrificial fibers are burned away.

18 Claims, 6 Drawing Sheets

(56) References Cited

U.S. PATENT DOCUMENTS

| | | | |
|---|---|---|---|
| 2015/0352639 A1* | 12/2015 | Toyserkani | B28B 1/001 |
| | | | 425/166 |
| 2016/0083305 A1* | 3/2016 | Goetz | C04B 35/6365 |
| | | | 501/88 |
| 2018/0362413 A1 | 12/2018 | Hall et al. | |
| 2019/0177240 A1 | 6/2019 | Harris | |
| 2020/0308066 A1* | 10/2020 | Shiang | C04B 41/457 |

* cited by examiner

SACRIFICIAL MATERIALS TO IMPROVE CHEMICAL VAPOR INFILTRATION OF B₄C LOADED PREFORMS

FIELD

The present disclosure relates generally to composites and, more specifically, to systems and methods for in-plane and/or through thickness slurry infiltration of composite preforms.

BACKGROUND

Aircraft typically utilize brake systems on wheels to slow or stop the aircraft during landings, taxiing and rejected takeoffs. The brake systems generally employ a brake stack or heat sink comprising a series of friction disks that may be forced into sliding contact with one another during brake actuation to slow or stop the aircraft. The brake stack typically comprises rotor disks and stator disks that, in response to axial compressive loads, convert the kinetic energy of the aircraft into heat through frictional forces experienced between the friction disks.

Carbon/carbon (C/C) composites and silicon carbide (SiC) based ceramic matrix composites (CMCs) have found use in the aerospace and other industries for fabricating brake stacks and heat sinks. The fibrous preforms used to form these composites may be infiltrated with a ceramic slurry. Infiltrating the fibrous preform through a thickness of the fibrous preforms (i.e., in the axial direction) tends to be difficult, as the porosity or open area within the preform is limited, thereby making it difficult for the slurry particles to penetrate the layers of the fibrous preform. Further, subsequent densification by chemical vapor infiltration (CVI) or other methods can be inhibited by the ceramic slurry making further densification difficult.

SUMMARY

A method forming a composite component is provided. The method includes mixing a slurry with sacrificial fibers, and injecting the mixed slurry into a fibrous preform. The sacrificial fibers are suspended in the fibrous preform along an injection pathway. The method includes heating the fibrous preform to form channels in the fibrous preform by burning away the sacrificial fibers suspended in the injection pathway, and densifying the fibrous preform.

In various embodiments, heating the fibrous preform includes a chemical vapor infiltration (CVI) process and heating the fibrous preform to a decomposition temperature, wherein forming the channels improves CVI.

In various embodiments, injecting the slurry with the sacrificial fibers into the fibrous preform includes using a syringe and multiple needle injections to inject the slurry with the sacrificial fibers into the fibrous preform.

In various embodiments, injecting the slurry with the sacrificial fibers occurs prior to completing B₄C slurry infiltration.

In various embodiments, the sacrificial fibers are a polyethylene or polyester fiber such that, in response to heating to a predetermined temperature during heating the fibrous preform, the sacrificial fibers burn away, wherein the predetermined temperature is 1000° C.

In various embodiments, the slurry is a ceramic particulate, such as an aqueous B₄C-based slurry.

In various embodiments, the slurry includes a high specific heat particulate and a liquid carrier.

In various embodiments, the method further includes mixing a boron carbide powder in water with appropriate additives to provide the slurry.

In various embodiments, the sacrificial fibers make up 5% of the slurry.

In various embodiments, the sacrificial fibers make up 10% of the slurry.

In various embodiments, heating the fibrous preform includes a heat treatment such as heating the fibrous preform at temperatures of between 100° F. and 205° F. (38° C. and 96° C.).

A method of forming a brake disk is also provided herein. The method includes mixing a slurry with sacrificial fibers, injecting the mixed slurry into a fibrous preform, and densifying the fibrous preform. The sacrificial fibers are burned away to form channels such that the densifying is improved.

In various embodiments, densifying the fibrous preform includes a chemical vapor infiltration (CVI) process, wherein forming the channels improves CVI.

In various embodiments, injecting the slurry with the sacrificial fibers into the fibrous preform includes using a syringe to inject the slurry with the sacrificial fibers into the fibrous preform.

In various embodiments, injecting the slurry with the sacrificial fibers occurs prior to completing B₄C slurry infiltration.

In various embodiments, the sacrificial fibers are a polyethylene or polyester fiber such that, when heated to certain temperatures during heating the fibrous preform or heating the fibrous preform to carbon CVI temperatures, the sacrificial fibers burn away.

In various embodiments, the slurry is a ceramic particulate, such as an aqueous B₄C-based slurry.

In various embodiments, the sacrificial fibers make up 5% of the slurry.

In various embodiments, the sacrificial fibers make up 10% of the slurry.

In various embodiments, the method further includes heating the fibrous preform. Heating the sacrificial fibers forms channels. Heating the fibrous preform includes a heat treatment such has heating the fibrous preform at temperatures of between 100° F. and 205° F. (38° C. and 96° C.).

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Provided herein, according to various embodiments, are manufacturing system(s) and method(s) for infiltrating ceramic into preforms used for fabrication of composite components. While numerous details are included herein pertaining to aircraft components, such as brake components, the manufacturing system(s) and method(s) disclosed herein can be applied to fabricate other composite components.

Figure 1A:
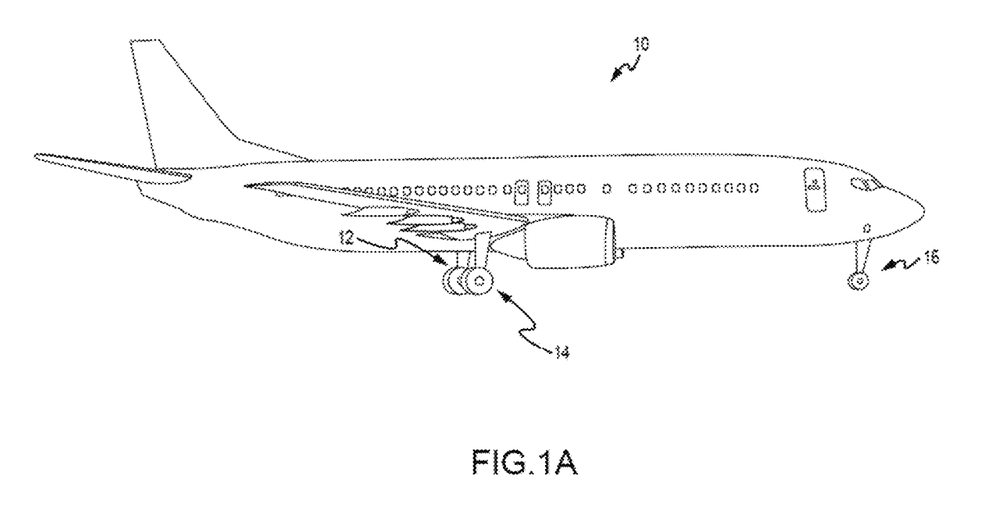
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14, and a nose landing gear 16. The landing gear support the aircraft 10 when it is not flying, allowing the aircraft 10 to taxi, take off, and land without damage. While the disclosure refers to the three landing gear configurations just described, the disclosure nevertheless contemplates any number of landing gear configurations.

Figure 1B:
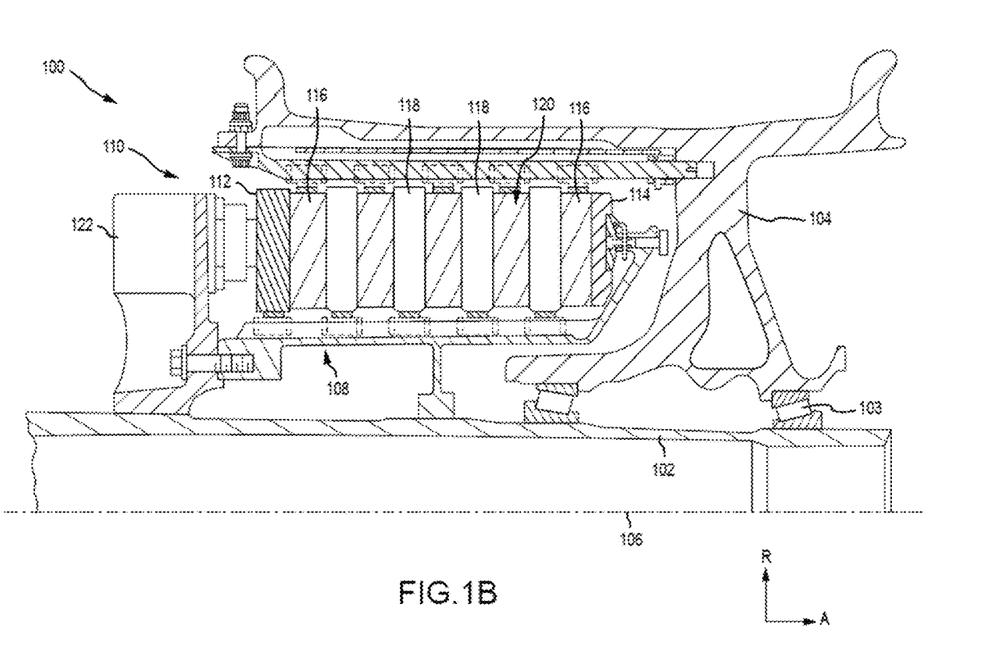
FIG. 1B illustrates a cross-sectional view of a brake assembly, in accordance with various embodiments.

Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism 100 is mounted on an axle 102 for use with a wheel 104 disposed on and configured to rotate about the axle 102 via one or more bearing assemblies 103. A central axis 106 extends through the axle 102 and defines a center of rotation of the wheel 104. As used herein, the term "radial" refers to directions perpendicular to a central axis 106 of fibrous preform, the term "axial" refers to direction parallel to central axis 106, and the term "circumferential" reference to directions about central axis 106. A torque plate barrel 108 (sometimes referred to as a torque tube or a torque plate) is aligned concentrically with the central axis 106, and the wheel 104 is rotatable relative to the torque plate barrel 108.

The brake mechanism 100 includes a piston assembly 110, a pressure plate 112 disposed adjacent the piston assembly 110, an end plate 114 positioned a distal location from the piston assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118, and the end plate 114 together form a brake heat sink or brake stack 120. The pressure plate 112, the end plate 114, and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114, and the plurality of stator disks 118.

An actuating mechanism for the brake mechanism 100 includes a plurality of piston assemblies, including the piston assembly 110, circumferentially spaced around a piston housing 122 (only one piston assembly is illustrated in FIG. 1B). Upon actuation, the plurality of piston assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the brake disks of brake mechanism 100 (e.g., rotor disks 116 and the stator disks 118) are fabricated from various composite materials, such as, for example, carbon/carbon (C/C) composite or ceramic matrix composite (CMCs), that enable the brake disks to withstand and dissipate the heat generated during and following a braking action.

In accordance with various embodiments, rotor disks 116 and/or stator disks 118 are each comprised of a carbon-carbon (C/C) material having a high specific heat particulate interspersed throughout the rotor disks 116 and/or stator disks 118, where high specific heat particulate includes any particulate or powder (typically ceramic) that raises the specific heat of the disk above that of C/C composite alone. For example, in various embodiments, the rotor disks 116 and/or stator disks 118 may comprise a C/C composite that includes a percentage of boron, a boron component, or other material having a high specific heat (i.e., a specific heat greater than the specific heat of the C/C composite alone). In various embodiments, rotor disks 116 and/or stator disks 118 may comprise a C/C composite with a percentage of boron carbide ($B_4C$) disposed substantially throughout the disk.

In various embodiments, the process of interspersing the boron carbide (or other high specific heat component) into the C/C composite is performed by a slurry infiltration process. As described in further detail below, the slurry may infiltrate a fiber preform employed to form the C/C composite in the radial, or in-plane, direction. The slurry may infiltrate via through thickness infiltration of the carbonize preforms. In various embodiments infiltrating in the radial, as opposed to the axial, direction may allow greater volumes and/or larger size particles to be infiltrated. Increasing the volume and/or size of the particles may facilitate the densification process by increasing the surface area available for the matrix material to bond to and by decreasing the open, or empty, volume within the preform. In-plane infiltration may also allow thicker fibrous preforms (e.g., fibrous preforms including a greater number of fiber layers) to be used in the manufacture rotor disks 116 and/or stator disks 118, as the compared to axial infiltration.

Figure 2:
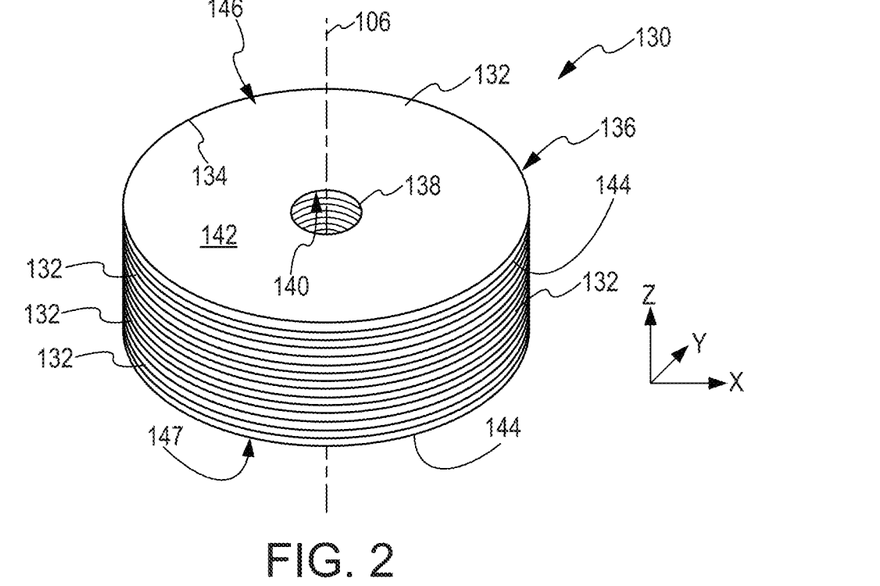
FIG. 2 illustrates a fibrous preform, in accordance with various embodiments.

Referring now to FIG. 2, a fibrous preform 130 is illustrated, in accordance with various embodiments. Fibrous preform 130 may be employed to form a rotor disk 116 or a stator disk 118, as described above. Fibrous preform 130 may comprise a porous structure comprised of a plurality of stacked textile layers 132. Each textile layer 132 having a thickness in a first dimension (i.e., the Z-direction) that may be substantially less than a thickness of the layer 132 in the other two dimensions (i.e., the X-direction and the Y-direction). As used herein, the "in-plane" direction refers to directions parallel to the thicker two dimensions (i.e., parallel to the X and Y directions and perpendicular to the Z-direction).

A porous structure may comprise any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 130 may be prepared by needling the textile layers 132 of fibrous preform 130. Needling the textile layers 132 of fibrous preform 130 tends to push fibers from one layer 132 to the next layer 132, thereby forming z-fibers that extend axially across the layers 132. Needling pulls fibers from the in-plane direction and forces them into the z-fiber direction. After needling, fibrous preform 130 may comprise fibers extending in three different directions: the radial direction, the circumferential direction, and the axial direction (or the X, Y, and Z directions).

Fibrous preform 130 may be fabricated using a net shape preforming technology or may be cut from a needled board. Fibrous preform 130 may be a lay-up of woven, braided or knitted textile layers 132. The fibrous material may be in the form of chopped carbon fibers molded to form layers 132. Prior to the densification process, the fibrous material may be formed into a preform having any desired shape or form. For example, the fibrous preform may be in the form of a disk having any shape such as, for example, a polygon, a cylinder, a triangle, annular, square, rectangle, pentagon, hexagon, octagon, or the like. In various embodiments, layers 132 and fibrous preform 130 may have a generally annular shape. In accordance with various embodiments, the outer circumferential (or outer perimeter) surfaces 134 of layers 132 may form an outer diameter (OD) 136 of fibrous preform 130, and the inner circumferential (or inner perimeter) surfaces 138 of layers 132 may form an inner diameter (ID) 140 of fibrous preform 130. Each layer 132 includes a first axial face 142 and a second axial face 144 opposite the first axial face 142. First and second axial faces 142, 144 extend from outer circumferential surface 134 to inner circumferential surface 138. Layers 132 are stacked such that the first axial face 142 of one layer 132 is oriented toward the second axial face 144 of the adjacent layer 132. First axial face 142 of the uppermost layer 132 forms the upper axial end 146 of fibrous preform 130 and the second axial face 144 of the bottommost layer 132 forms the lower axial end 147 of fibrous preform 130 (i.e., the two layers 132 that are farther apart from one another in the axial direction form the axial ends 146, 147 of the fibrous preform).

Figure 3:
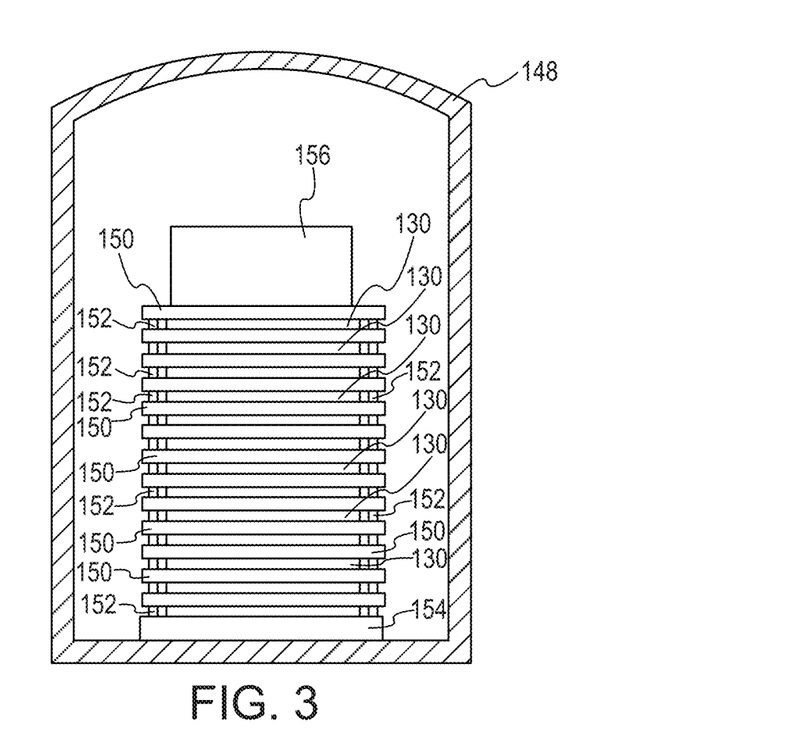
FIG. 3 illustrates a fibrous preform in a carbonization furnace, in accordance with various embodiments.

As shown in FIG. 3, fibrous preforms 130 may be placed in a furnace 148 for carbonization. The carbonization process may be employed to convert the fibers of the fibrous preforms 130 into pure carbon fibers, as used herein only "pure carbon fibers" means carbon fibers comprised of at least 99% carbon. The carbonization process is distinguished from the densification process described below in that the densification process involves infiltrating the pores of the fibrous preform 130 and depositing a matrix (e.g., carbon, phenolic resin, or any other desired matrix material) within and around the carbon fibers of the fibrous preform, and the carbonization process refers to the process of converting the fibers of the fibrous preform 130 into pure carbon fibers.

In various embodiments, a plurality of fibrous preforms 130 may be placed on top of one another with separator plates 150 and spacing stops 152 disposed between adjacent fibrous preforms 130. For example, the bottommost fibrous preform 130 may be placed on a base plate 154 at the bottom of carbonization furnace 148. A separator plate 150 may be placed on top of the bottommost fibrous preform 130. Another fibrous preform 130 may then be placed on the separator plate 150, and another separator plate 150 may be placed on that fibrous preform 130. A stack of fibrous preforms 130 and separator plates 150 may be constructed in this manner, with each fibrous preform 130 being separated from superjacent and subjacent fibrous preforms 130 by separator plates 150. Stops 152 may be placed between each of the separator plates 150. The stops 152 may comprise a height that is less than the thickness of the fibrous preform 130 prior to carbonization. Stops 152 may define a target thickness of the fibrous preform 130 after carbonization. In that regard, after the stack of fibrous preforms 130 is constructed, and before the carbonization process has started, gaps may exist between the stops 152 and adjacent separator plates 150. During carbonization, a compressive load may be applied to the fibrous preforms 130, thereby compressing fibrous preforms 130 until stops 152 contact adjacent separator plates 150.

In various embodiments, compressive pressure may be applied to fibrous preforms 130 during the carbonization. The compressive pressure may be applied by placing a weight 156 over fibrous preforms 130, or by applying a compressive load to the fibrous preforms 130 by other suitable means. The compressive pressure may be applied along the direction of the z-fibers. It will be appreciated by those skilled in the art that the mass of weight 156 and/or the compressive force generated by weight 156 may vary depending on the size of fibrous preforms 130, the pre-carbonization fiber volume of fibrous preforms 130, the desired post-carbonization fiber volume of fibrous preforms 130, and/or the number fibrous preforms 130 being compressed. As used herein, "fiber volume" refers the percentage of the total volume of the fibrous preform that is formed by the fibers of the fibrous preform. For example, a fiber volume of 18% means the fibers of the fibrous preform form 18% of the total volume of fibrous preform. In various embodiments, after carbonization, fibrous preform 130 comprises a fiber volume of between 10% and 50%. In various embodiments, after carbonization, fibrous preform 130 comprises a fiber volume of between 15% and 25%. In various embodiments, fibrous preforms 130 having a low fiber volume may be desirable for the infiltration methods disclosed herein. In various embodiments, after carbonization, fibrous preform 130 may comprise a fiber volume of less than 25%. For example, in various embodiments, after carbonization, fibrous preform 130 may comprise a fiber volume of 21% or, in various embodiments, fibrous preform 130 may comprise a fiber volume of 18%.

After carbonization, fibrous preform 130, may be densified using, for example, CVI. In various embodiments, prior to densification, fibrous preform 130 is infiltrated with a slurry including a high specific heat particulate. For example, in various embodiments, fibrous preform 130 is infiltrated with a ceramic slurry (i.e., a slurry comprised of a liquid carrier and ceramic particulates). In various embodiments, the slurry infiltration process comprises preparation of a slurry including a ceramic particulate (e.g., an aqueous $B_4C$-based slurry) and immersing the carbonized fibrous preform 130 into the slurry for a period of time sufficient for the particulate (e.g., the $B_4C$) to infiltrate the fibrous preform 130.

The slurry comprises sacrificial fibers. For instance, the sacrificial fibers/particulates are mixed into the slurry. The sacrificial fibers may be a polyethylene or polyester fiber such that, in response to heating to carbon CVI temperatures (e.g., 100° F. and 205° F. (38° C. and 96° C.)) will burn. In various embodiments, the preform is heated up to 1000° C. in order to cause the sacrificial fibers for burn away, or decompose. When the sacrificial fibers are burned away, or decompose, channels are formed, thus improving carbon CVI infiltration. For instance, the channels provide a pathway for the CVI to get to in. However, polyester or polyethylene fibers may be too large to incorporate directly into the $B_4C$ slurry. Accordingly, the sacrificial fibers may be injected into the fibrous preform 130. For instance, the sacrificial fibers may be injected using a syringe or other means, prior to completing $B_4C$ slurry infiltration. By injecting using a syringe, the sacrificial fibers may be distributed in the matrix of the boron carbide.

Slurry may include high specific heat particulate and a liquid carrier (such as, for example, water and/or alcohol). In various embodiments, slurry may further include a high specific heat particulate, a binder (e.g., a polymeric adhesive or polyvinyl acetate), and a liquid carrier (e.g., water). It will be appreciated by those skilled in the art that liquid carriers other than water may be used and that the type and/or volume of liquid carrier and/or of binder may be selected based on the composition of the high specific heat particulate. In various embodiments, slurry may be a $B_4C$-based slurry and may be prepared by mixing $B_4C$ powder in water with appropriate additives, such as wetting agents and dispersants. The $B_4C$ powder may comprise particulates having an average particle sizes from sub-micron up to about 30 microns. As used in the previous context only, "about" means±5 microns.

Figure 6A:
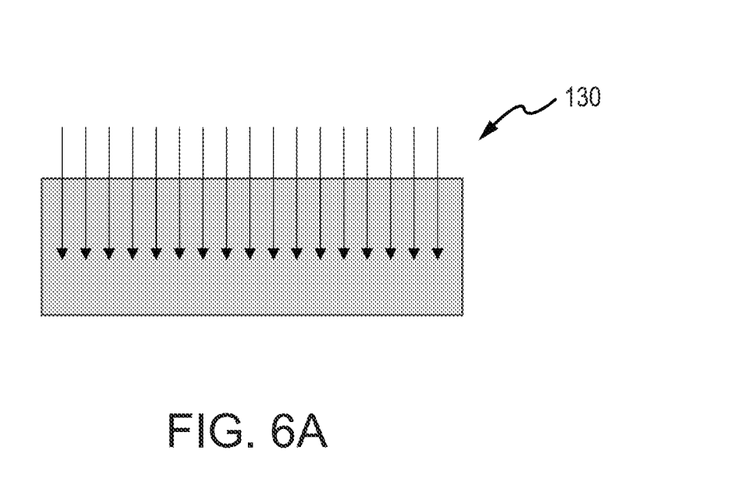
FIGS. 6A and 6B illustrate a fibrous preform with multiple needle injections to inject a slurry with sacrificial fibers, in accordance with various embodiments.
Figure 6B:
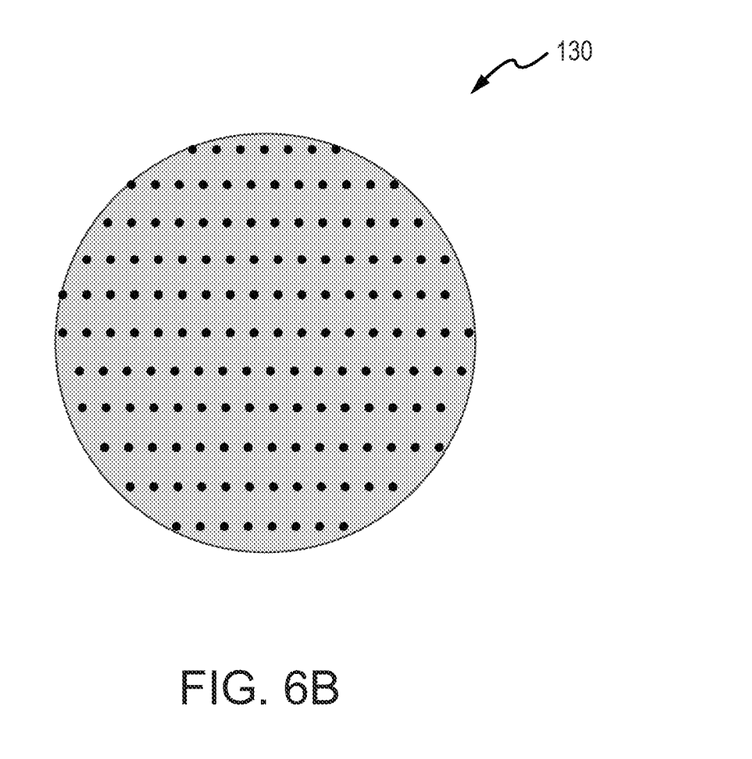

The slurry further includes the sacrificial fibers. The sacrificial fibers are added to the solution of the slurry. In various embodiments, the sacrificial fibers make up 5% of the slurry solution. In various embodiments, the sacrificial fibers make up 10% of the slurry solution. For instance, the sacrificial fibers make up 0.5%-10% of the slurry. The sacrificial fibers may be a micro polyester particle. The slurry solution may be loaded into the syringe. A user may then use the syringe to inject the slurry, including the sacrificial fibers, into the fibrous preform 130. The user may inject the fibrous preform 130 in a plurality of locations (e.g., see FIGS. 6A and 6B). For instance, the user may inject/poke the fibrous preform 130 at ten locations. In various embodiments, a bank of syringes may be provided to operate as an assembly-line system to prepare multiple fibrous preforms may be injected simultaneously with the sacrificial fibers.

Figure 4:
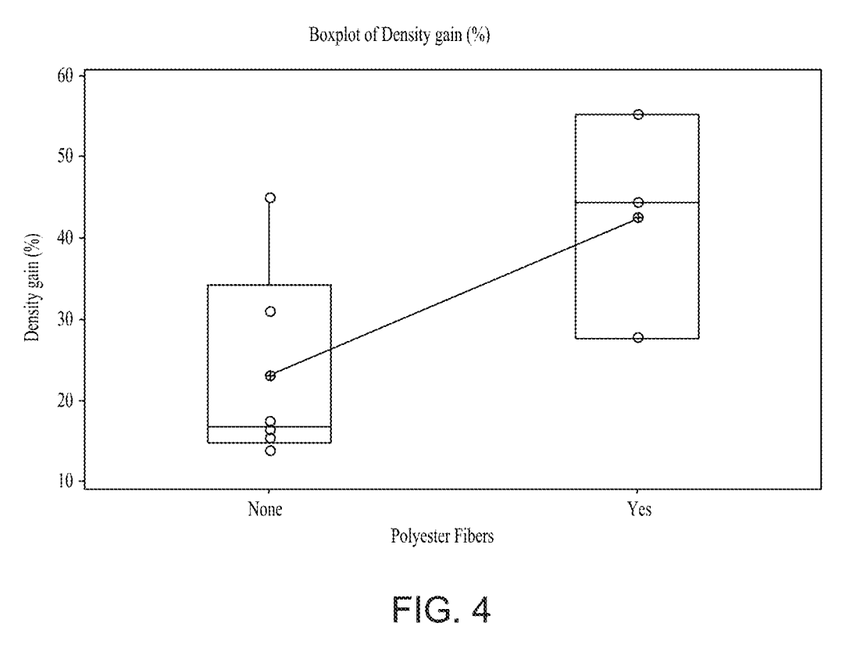
FIG. 4 illustrates improvement results with incorporation of sacrificial fibers, in accordance with various embodiments.

Infiltration using a syringe facilitates achieving a uniform distribution of the sacrificial fibers, which in turn improves carbon CVI infiltration once the fibers are burned around during the heat-up to carbon CVI process temperature. By raising the thermal capacity of the material, more energy may be absorbed per unit mass. Accordingly, the brakes may be manufactured smaller, for instance. Further, the friction and wear characteristics may be improved. FIG. 4 illustrates a carbon CVI density gain improvement with incorporation of the sacrificial polyester fibers. For instance, results have demonstrated a significant increase in carbon CVI weight pickup compared to materials processed without the sacrificial fibers. This improvement enables target carbon/boron carbide composite densities to be achieved in two or fewer carbon CVI cycles.

For instance, as illustrated in FIG. 4, boxplots of density gain (%) are provided for both a fibrous preform as described herein without the sacrificial fibers (left) and with the sacrificial fibers (right). Each of the boxes of the boxplot are drawn from Q1 to Q3 (e.g., the $25^{th}$ percentile to the $74^{th}$ percentile) with horizontal line 402, 404 drawn in the middle denoting the median (e.g., the $50^{th}$ percentile). The "whisker" plotted in the data without the sacrificial fibers (e.g., point 406) indicates a maximum, and outlier, in the data points. Further, point 408 indicates the maximum for the data with the sacrificial fibers. Minimums for data without the sacrificial fibers and with the sacrificial fibers are denotes by points 410 and 412, respectively. Points 414, 416 denote the means for data without the sacrificial fibers and with the sacrificial fibers, respectively.

In various embodiments, following infiltration, the fibrous preform 130 is heated, or dried. In various embodiments, a heat treatment may be performed, following infiltration, to remove the liquid carrier of the slurry from the fibrous preform 130. In various embodiments, the heat treatment may include heating fibrous preform 130 at temperatures of between 100° F. and 205° F. (38° C. and 96° C.). In various embodiments, the fibrous preform 130 may be air-dried or dried at room temperature (e.g., at a temperature between 65° F. and 85° F. (18° C. and 29° C.)). After heating or drying, the fibrous preform 130 is densified (e.g., by a chemical vapor infiltration (CVI) process) to form a matrix around the fibers of fibrous preform 130. In various embodiments, the sacrificial fibers decompose and create channels for infiltration during heat up to carbon CVI temperatures at approximately 1000° C.

Figure 5:
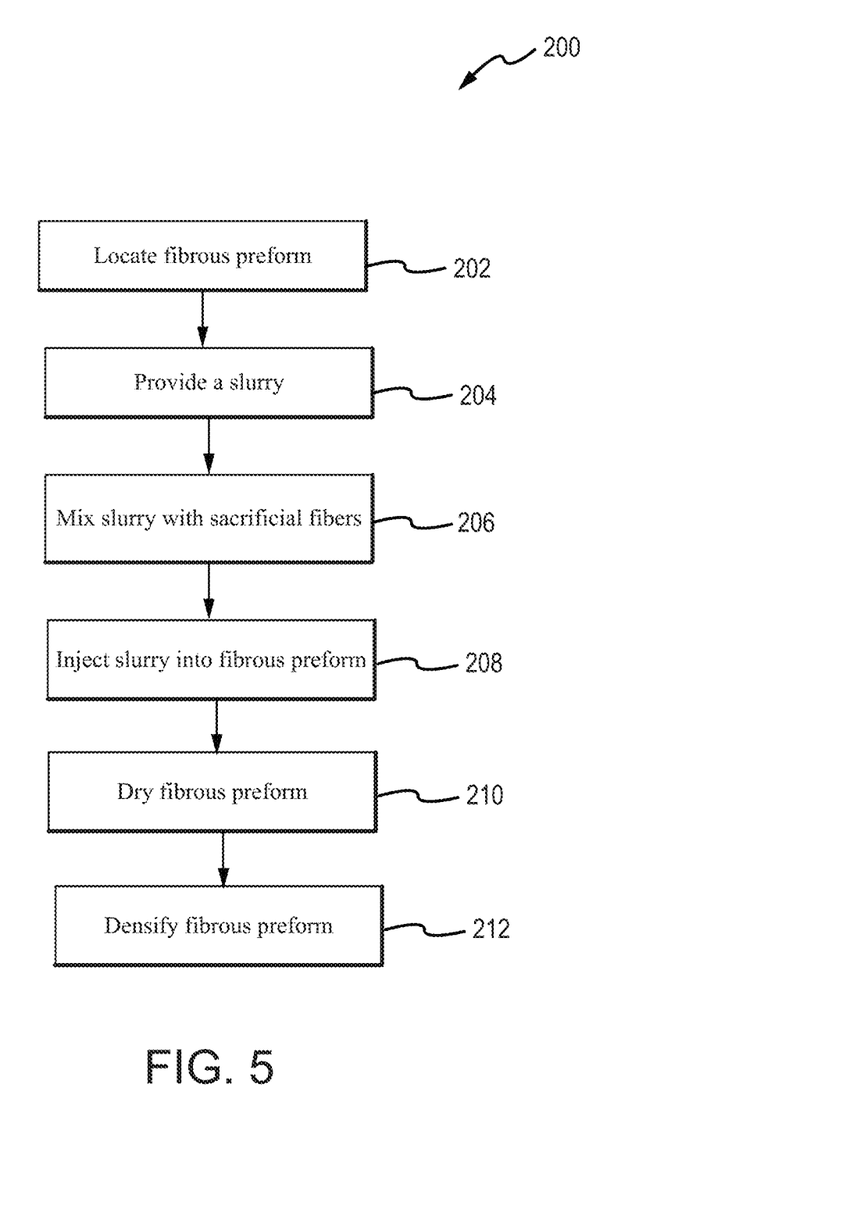
FIG. 5 illustrates a method of forming a composite component, in accordance with various embodiments.

With reference to FIG. 5, a method 200 of forming a composite component is illustrated. In accordance with various embodiments, method 200 may include locating a fibrous preform (202). The method 200 includes providing a slurry (step 204). The slurry includes a solution of $B_4C$ and sacrificial fibers. For instance, the method 200 includes mixing the slurry with sacrificial fibers (step 206). The method includes injecting the slurry mixed with sacrificial fibers into the fibrous preform (step 208). In various embodiments, method 300 may further include heating, or drying, the fibrous preform (step 210) and densifying the fibrous preform (step 212). Due to the sacrificial fibers, channels are formed upon the heating or drying of the fibrous preform in step 306 such that the improving carbon CVI infiltration. For instance, the sacrificial fibers are suspended in the fibrous preform 130 along the injection pathway created. Thus, in response to the fibrous preform 130 being heated to a temperature higher than the sacrificial fibers can withstand, the sacrificial fibers burn and leave behind channels. The addition of polyester or other sacrificial fibers/particles, following slurry infiltration and heat-up during CVI, burn away leaving channels for CVI precursor gases to penetrate the carbonized preform and the ceramic slurry. The channels in the carbon fiber preform infiltrated with ceramic slurry do not form in the material until the sacrificial polyethylene or polyester fiber is burned away during heat-up to carbon CVI temperatures (e.g., temperatures above the decomposition temperature of the sacrificial fibers).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of forming a composite component, comprising:
   mixing a slurry with sacrificial fibers, wherein the slurry is a ceramic particulate including an aqueous $B_4C$ based slurry, and wherein the sacrificial fibers contain at least one micro polyester particle;
   injecting the mixed slurry into a fibrous preform, wherein the sacrificial fibers are suspended in the fibrous preform along an injection pathway, wherein the injection pathway is oriented substantially parallel to the Z-axis, and wherein injecting comprises penetrating the fibrous preform;
   heating the fibrous preform to form channels in the fibrous preform by burning away the sacrificial fibers suspended in the injection pathway; and
   densifying the fibrous preform.

2. The method of claim 1, wherein heating the fibrous preform includes a chemical vapor infiltration (CVI) process and heating the fibrous preform to a decomposition temperature, wherein forming the channels improves CVI.

3. The method of claim 1, wherein injecting the slurry with the sacrificial fibers into the fibrous preform includes using a syringe and multiple needle injections to inject the slurry with the sacrificial fibers into the fibrous preform.

4. The method of claim 1, wherein injecting the slurry with the sacrificial fibers occurs prior to completing the $B_4C$ slurry infiltration.

5. The method of claim 1, wherein the sacrificial fibers are a polyethylene or polyester fiber such that, in response to heating to a predetermined temperature during heating the fibrous preform, the sacrificial fibers burn away, wherein the predetermined temperature is 1000° C.

6. The method of claim 1, wherein the slurry includes a high specific heat particulate that raises the specific heat of the composite component and a liquid carrier.

7. The method of claim 1, further comprising mixing the $B_4C$ powder in water with appropriate additives to provide the slurry.

8. The method of claim 1, wherein the sacrificial fibers make up 5% of the slurry.

9. The method of claim 1, wherein the sacrificial fibers make up 10% of the slurry.

10. The method of claim 1, wherein heating the fibrous preform includes a heat treatment such has heating the fibrous preform at temperatures of between 100° F. and 205° F. (38° C. and 96° C.).

11. A method of forming a brake disk, comprising:
    mixing a slurry with sacrificial fibers, wherein the slurry is a ceramic particulate including an aqueous $B_4C$ based slurry, and wherein the sacrificial fibers contain at least one micro polyester particle;
    injecting the mixed slurry into a fibrous preform wherein the sacrificial fibers are suspended in the fibrous preform along an injection pathway, wherein the injection pathway is oriented substantially parallel to the Z-axis, and wherein injecting comprises penetrating the fibrous preform; and
    densifying the fibrous preform, wherein the sacrificial fibers are burned to form channels.

12. The method of claim 11, wherein densifying the fibrous preform includes a chemical vapor infiltration (CVI) process, wherein forming the channels improves CVI.

13. The method of claim 11, wherein injecting the slurry with the sacrificial fibers into the fibrous preform includes using a syringe to inject the slurry with the sacrificial fibers into the fibrous preform.

14. The method of claim 11, wherein injecting the slurry with the sacrificial fibers occurs prior to completing the $B_4C$ slurry infiltration.

15. The method of claim 11, wherein the sacrificial fibers are a polyethylene or polyester fiber such that, when heated to certain temperatures during heating the fibrous preform or heating the fibrous preform to carbon CVI temperatures, the sacrificial fibers burn away.

16. The method of claim 11, wherein the sacrificial fibers make up 5% of the slurry.

17. The method of claim 11, wherein the sacrificial fibers make up 10% of the slurry.

18. The method of claim 11, further comprising heating the fibrous preform, wherein heating the sacrificial fibers forms channels, wherein heating the fibrous preform includes a heat treatment such has heating the fibrous preform at temperatures of between 100° F. and 205° F. (38° C. and 96° C.).

* * * * *